(12) United States Patent
Kakizawa et al.

(10) Patent No.: US 11,078,327 B2
(45) Date of Patent: Aug. 3, 2021

(54) POLYESTER COPOLYMER AND METHOD OF PRODUCING SAME

(71) Applicant: Toray Industries, Inc., Tokyo (JP)

(72) Inventors: Yoshinori Kakizawa, Otsu (JP); Koji Kadowaki, Otsu (JP); Kazuhiro Tanahashi, Otsu (JP); Hirokazu Sakaguchi, Otsu (JP); Kazuyuki Kidoba, Otsu (JP)

(73) Assignee: Toray Industries, Inc., Tokyo (JP)

( * ) Notice: Subject to any disclaimer, the term of this patent is extended or adjusted under 35 U.S.C. 154(b) by 9 days.

(21) Appl. No.: 16/629,763

(22) PCT Filed: Aug. 1, 2018

(86) PCT No.: PCT/JP2018/028846
§ 371 (c)(1),
(2) Date: Jan. 9, 2020

(87) PCT Pub. No.: WO2019/035357
PCT Pub. Date: Feb. 21, 2019

(65) Prior Publication Data
US 2020/0216607 A1    Jul. 9, 2020

(30) Foreign Application Priority Data
Aug. 17, 2017 (JP) .............................. JP2017-157327

(51) Int. Cl.
*C08G 63/08* (2006.01)
*C08G 63/78* (2006.01)

(52) U.S. Cl.
CPC ............. *C08G 63/08* (2013.01); *C08G 63/78* (2013.01)

(58) Field of Classification Search
USPC ....................................... 528/272, 274, 354
See application file for complete search history.

(56) References Cited

U.S. PATENT DOCUMENTS

| | | | | |
|---|---|---|---|---|
| 4,081,494 | A | * | 3/1978 | Sakai .................. C08G 63/672 525/444 |
| 5,593,778 | A | * | 1/1997 | Kondo .................. C08G 63/60 264/239 |
| 5,844,066 | A | * | 12/1998 | Kakizawa ............. C08G 63/912 528/354 |
| 10,507,260 | B2 | | 12/2019 | Hissink et al. |
| 2003/0187181 | A1 | | 10/2003 | Masanori et al. |
| 2014/0018505 | A1 | | 1/2014 | Fujita et al. |
| 2017/0081572 | A1 | | 3/2017 | Schaekens |

FOREIGN PATENT DOCUMENTS

| | | |
|---|---|---|
| EP | 3 778 716 | 2/2021 |
| GB | 2 127 839 | 4/1984 |
| JP | 03-269013 | 11/1991 |
| JP | 2000-143781 | 5/2000 |
| JP | 3161729 | 4/2001 |
| JP | 2006-183042 | 7/2006 |
| JP | 2006-519633 | 8/2006 |
| JP | 2017-521507 | 8/2017 |
| WO | 98/01493 | 1/1998 |
| WO | 2012/133608 | 10/2012 |

OTHER PUBLICATIONS

Jeon, Oju et al., "Synthesis and Characterization of Poly($_L$-lactide)-Poly(ε-caprolactone) Multiblock Copolymers", *Macromolecules*, 36(15): pp. 5585-5592, Jun. 25, 2003. https://doi.org/10.1021/ma034006v (English Abstract Only).

Grijpma, D.W. et al., "Polymerization temperature effects on the properties of $_L$-lactide and ε-caprolactone copolymers", *Polymer Bulletin*, 25(3): pp. 335-341, Mar. 1991. https://doi.org/10.1007/BF00316903 (English Abstract Only).

Extended European Search Report dated Jun. 4, 2021, of counterpart European Application No. 18 847 031.4.

* cited by examiner

*Primary Examiner* — Terressa Boykin
(74) *Attorney, Agent, or Firm* — DLA Piper LLP (US)

(57) ABSTRACT

A polyester copolymer has two types of ester bond-forming monomer residues as main structural units when the two types of ester bond-forming monomers are defined as "monomer A" and "monomer B", respectively, the polyester copolymer satisfies (1) and (2): (1) an R value represented by equation:

$R \text{ value} = [AB]/(2[A][B]) \times 100$

[A]: mole fraction of monomer A residues in the polyester copolymer [% by mol], [B]: mole fraction of monomer B residues in the polyester copolymer [% by mol], and [AB]: mole fraction of a structure in which the monomer A residues and the monomer B residues are adjacent to each other (A-B and B-A) in the polyester copolymer [% by mol], is 0.45 or more and 0.99 or less; and (2) a crystallization rate of at least one of the monomer A residues and the monomer B residues is less than 14%.

15 Claims, 3 Drawing Sheets

POLYESTER COPOLYMER AND METHOD OF PRODUCING SAME

TECHNICAL FIELD

This disclosure relates to a polyester copolymer and a method of producing the same and, more particularly, to a polyester copolymer capable of exhibiting biodegradability or bioabsorbability.

BACKGROUND

Polyesters produced from ester bond-forming monomers, typified by polylactic acid, polyglycolic acid, polycaprolactone or copolymers thereof, are attracting attention as biodegradable or bioabsorbable polymers, and are used in various fields, for example, medical materials such as sutures, sustained release materials for pharmaceuticals, agricultural chemicals, fertilizers and the like. Furthermore, polyesters are also expected as a packaging material such as containers and films as a biodegradable general-purpose plastic.

However, in general, biodegradable polyesters and bioabsorbable polyesters produced from ester bond-forming monomers are fragile. For this reason, development of high molecular weight polymers and various copolymers has been attempted for the purpose of obtaining biodegradable polymers having improved mechanical characteristics and strength and moldability that can withstand practical use.

For example, Japanese Patent No. 3161729 discloses a synthesis method by first producing lactide and glycolide from lactic acid and glycolic acid, and subjecting these to ring-opening polymerization to obtain a higher molecular weight polymer, in synthesis of polylactic acid and polyglycolic acid which has been conventionally performed by polycondensation.

In addition, many attempts have been also made to develop a new multi-block copolymer in which polylactic acid that is hard and brittle because of its high crystallinity and other highly mobile polymers are combined. For example, Oju Jeon, et al., *Macromolecules* 2003, 36, 5585-5592 describes a multi-block copolymer obtained by connecting a polylactic acid-based polymer obtained by reacting lactide and hexanediol and a polycaprolactone having hydroxyl groups at both ends. Japanese Patent Laid-open Publication No. 2006-183042 also discloses a multi-block copolymer with improved mechanical characteristics without impairing biodegradability, by including a first block made of polylactic acid including hydroxyl groups at both ends, and a second block made of a polymer having higher mobility than polylactic acid.

The multi-block copolymers described in Japanese Patent Laid-open Publication No. 2006-183042 and Oju Jeon, et al., *Macromolecules* 2003, 36, 5585-5592 have superior mechanical strength as compared to simple homopolymers such as polylactic acid. On the other hand, in a bioabsorbable polymer in the medical field such as a scaffold material for regenerative medicine and an artificial blood vessel, a soft characteristic similar to a living tissue may be required. In addition, many of the elastomers currently used industrially are non-biodegradable, and accumulation in the environment after disposal has been a big problem. Therefore, making the elastomer biodegradable has great significance. That is, a biodegradable and/or bioabsorbable polymer having a low Young's modulus is required.

However, even if it is soft, when it is inferior in moldability or easily broken, it is extremely difficult to use it industrially. Therefore, a biodegradable and/or bioabsorbable polymer with characteristics that hardly cause breakage even it is soft, that is, having a low Young's modulus and a high tensile strength is required. However, it has been difficult to achieve both of these characteristics with conventionally known biodegradable and/or bioabsorbable polyesters.

It could therefore be helpful to provide a novel polyester copolymer that solves this problem.

SUMMARY

We thus provide:

A polyester copolymer having two types of ester bond-forming monomer residues as main structural units, in which, when the two types of ester bond-forming monomers are defined as "monomer A" and "monomer B", respectively, the polyester copolymer satisfies (1) and (2):

(1) An R value represented by:

$$R\ \text{value} = [AB]/(2[A][B]) \times 100$$

[A]: mole fraction of monomer A residues in the polyester copolymer [% by mol],

[B]: mole fraction of monomer B residues in the polyester copolymer [% by mol], and

[AB]: mole fraction of a structure in which the monomer A residues and the monomer B residues are adjacent to each other (A-B and B-A) in the polyester copolymer [% by mol], is 0.45 or more and 0.99 or less.

(2) A crystallization rate of at least one of the monomer A residues and the monomer B residues is less than 14%.

It is possible to obtain a polyester copolymer suitable for medical applications and elastomer applications having a low Young's modulus and a high tensile strength, and can exhibit biodegradability and bioabsorbability.

DETAILED DESCRIPTION

Polyester Copolymer

Figure 1:
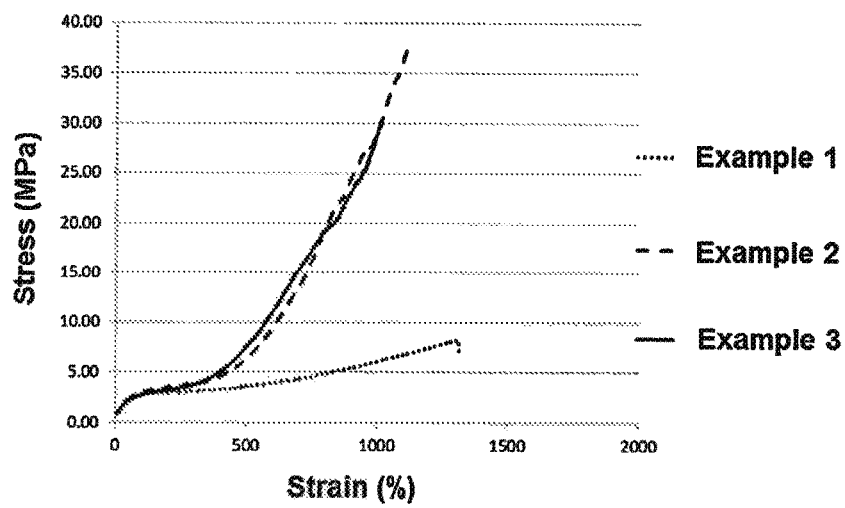
FIG. 1 shows stress-strain curves obtained by performing a tensile test on polyester copolymers synthesized in Examples 1, 2, and 3.
Figure 2:
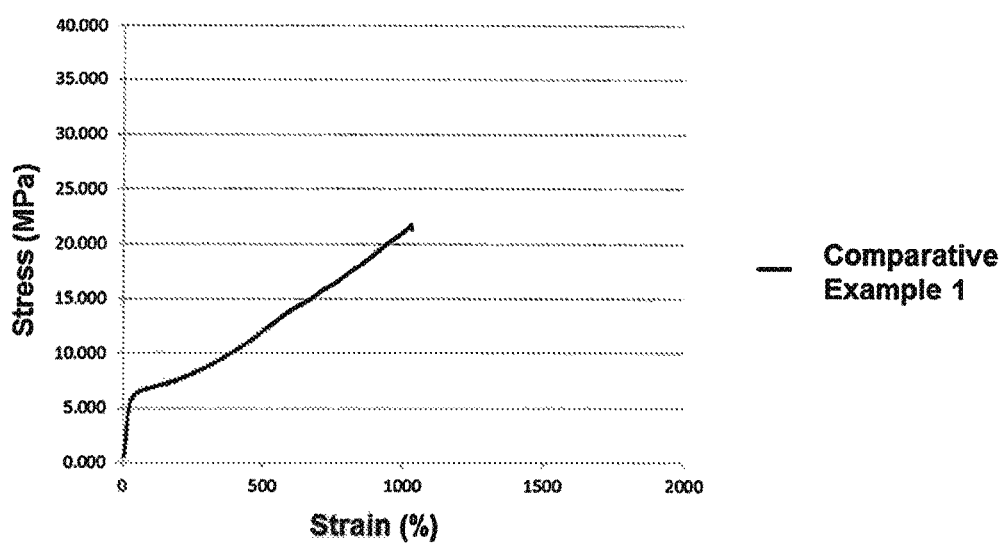
FIG. 2 shows a stress-strain curve obtained by performing a tensile test on a polyester copolymer synthesized in Comparative Example 1.
Figure 3:
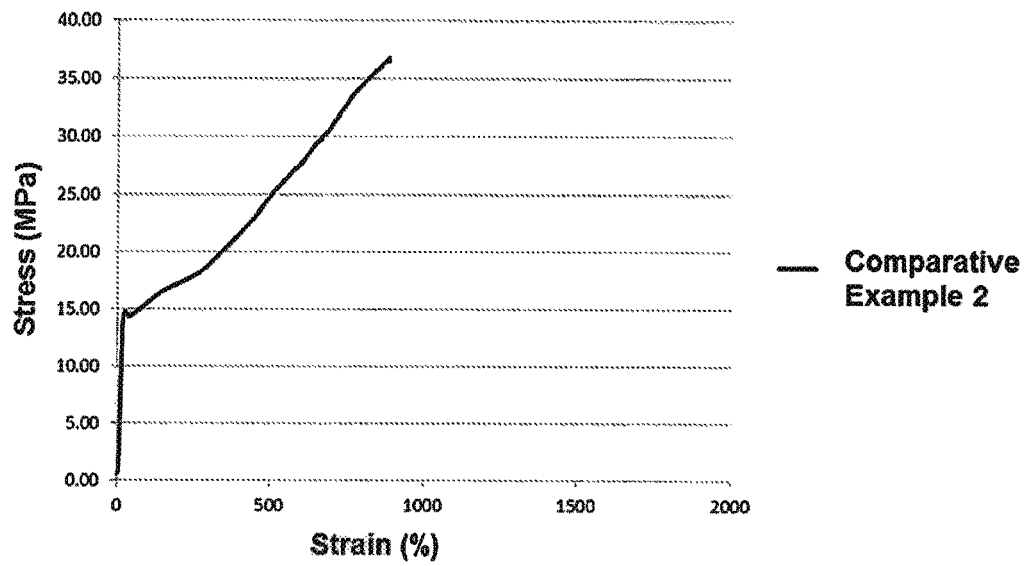
FIG. 3 shows a stress-strain curve obtained by performing a tensile test on a polyester copolymer synthesized in Comparative Example 2.
Figure 4:
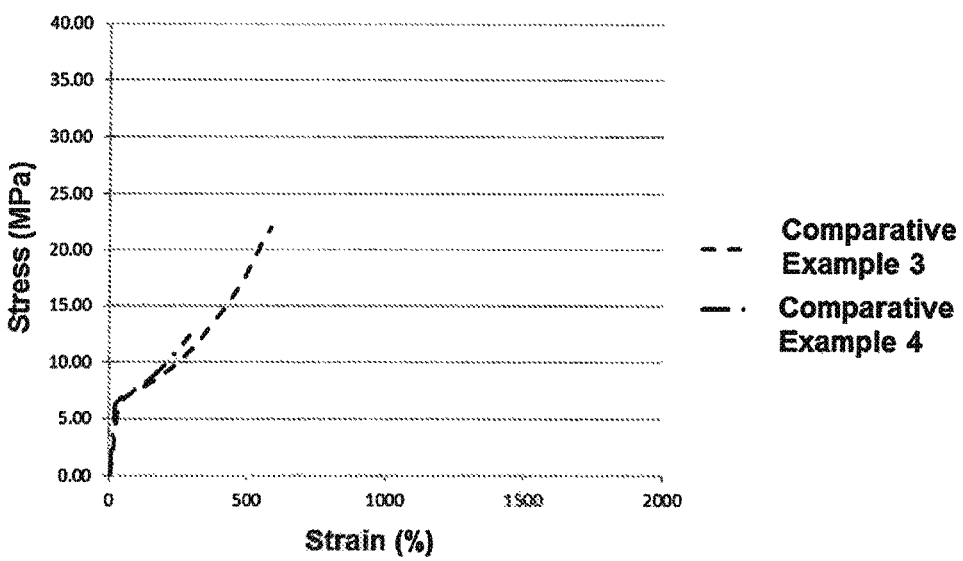
FIG. 4 shows stress-strain curves obtained by performing a tensile test on polyester copolymers synthesized in Comparative Examples 3 and 4.

The polyester copolymer is a copolymer having two types of ester bond-forming monomer residues as main structural units. The two types of ester bond-forming monomers are sometimes expressed herein as "monomer A" and "monomer B", respectively.

The "ester bond-forming monomer" refers to a monomer forming a polymer in which monomer units are connected by an ester bond, i.e., polyester, after polymerization.

As the ester bond-forming monomer, it is preferable to use hydroxycarboxylic acid. Further, a lactone which is a cyclic compound obtained by intramolecular dehydration condensation of a hydroxy group and a carboxyl group of hydroxycarboxylic acid, and a lactide which is a cyclic compound obtained by dehydration condensation of mutual hydroxy group and carboxyl group of two molecules of hydroxycarboxylic acid can be also preferably used.

As the hydroxycarboxylic acid, it is particularly preferable to use an aliphatic hydroxycarboxylic acid. Examples of the aliphatic hydroxycarboxylic acid include lactic acid, glycolic acid, hydroxybutyric acid, hydroxyvaleric acid, hydroxypentanoic acid, hydroxycaproic acid, hydroxyheptanoic acid and the like, and lactic acid, glycolic acid, and hydroxycaproic acid are particularly preferred.

$_L$-Lactic acid, D-lactic acid, and mixtures thereof can be used as lactic acid, and $_L$-lactic acid is preferably used from the aspects of physical properties and biocompatibility of the polymer to be obtained. When a mixture is used as a monomer, the $_L$-isomer content is preferably 85% or more, and more preferably 95% or more.

As lactone, caprolactone, dioxepanone, ethylene oxalate, dioxanone, 1,4-dioxane-2,3-dione, β-propiolactone, δ-valerolactone, β-propiolactone, β-butyrolactone, γ-butyrolactone, pivalolactone and the like can be used.

As lactide, dilactide obtained by dehydration condensation of two molecules of lactic acid, glycolide obtained by dehydration condensation of two molecules of glycolic acid, and tetramethylglycolide can be used.

As the ester bond-forming monomer, derivatives of the monomers exemplified above can also be used.

The term "monomer residue" is, in principle, a repeating unit of a chemical structure derived from monomers, in the chemical structure of a copolymer obtained by polymerizing two or more monomers including the monomers. For example, when lactic acid (CH$_3$CH(OH)COOH) and caprolactone (ε-caprolactone: the following formula)

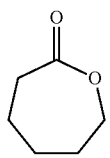

are polymerized to form a copolymer of lactic acid and caprolactone,

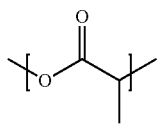
(R1)

is a lactic acid monomer residue, and the unit represented by the following formula is a caprolactone monomer residue.

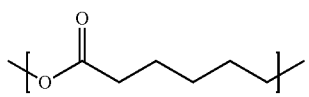
(R2)

As an exception, when a dimer such as lactide is used as a monomer, the "monomer residue" means one of a structure repeated twice derived from the dimer. For example, when dilactide ($_L$-(−)-lactide: the following formula)

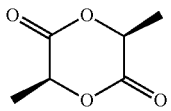

is polymerized with caprolactone, a structure in which a structure represented by the above formula (R1) is repeated twice as a dilactide residue is formed in the chemical structure of the copolymer. In this example, one of the lactic acid units is regarded as a "monomer residue", and "monomer residues" derived from dilactide, that is, two lactic acid residues are considered to be formed.

Having two types of monomer residues as "main structural units" means that a sum of the number of the two types of monomer residues is 50% by mol or more of the whole polymer including other monomer residues, and each residue is 20% by mol or more of the whole polymer. For example, having monomer A residues and monomer B residues as main structural units means that a sum of the number of residues of the monomer A residues and the monomer B residues is 50% by mol or more of the whole polymer, the monomer A residues are 20% by mol or more of the whole polymer, and the monomer B residues are 20% by mol or more of the whole polymer. The mole fractions ([% by mol]) of the monomer A residues, the monomer B residues and other residues can be determined from area values of signals derived from respective residues by nuclear magnetic resonance (NMR) measurement. For example, when the monomer A residue is a lactic acid residue and the monomer B residue is a caprolactone residue, the molar fractions ([% by mol]) thereof can be measured by the method described in Measurement Example 2 described later.

The sum of the monomer A residues and the monomer B residues is, from the above definition, 50% by mol or more, preferably 75% by mol or more, and more preferably 90% by mol or more of the whole polymer including other monomer residues. Also, the monomer A residues and the monomer B residues are, from the above definition as well, each 20% by mol or more, preferably 30% by mol or more, and more preferably 40% by mol or more. Particularly preferable is a polymer in which the sum of the monomer A residues and the monomer B residues is 100% of the whole polymer, that is, a polymer consisting only of the monomer A and the monomer B.

The molar ratio of the monomer A residues to the monomer B residues is preferably 7/3 to 3/7 and more preferably 6/4 to 4/6 because the polyester copolymer approaches homopolymer-like characteristics when one monomer is excessively present.

As long as the desired effects are not impaired, another monomer that can be copolymerized with the two types of ester bond-forming monomers constituting the main structural units can be also further copolymerized. As such a monomer, yet another one of the above-mentioned ester bond-forming monomers can be used.

Moreover, it is also preferred to copolymerize monomers that function as a linker. Examples of the monomers that function as a linker include hydroxycarboxylic acids different from the two types of ester bond-forming monomers constituting the main structural units, dialcohols, dicarboxylic acids, amino acids, diamines, diisocyanates, diepoxides and the like.

By including a monomer other than the ester bond-forming monomers as a structural unit, it shall be written herein as a "polyester copolymer" including a copolymer partially including a structural unit connected by a bond other than an ester bond.

The polyester copolymer preferably has biodegradability or bioabsorbability. A person skilled in the art would be able to synthesize a copolymer that exhibits appropriate biodegradability or bioabsorbability depending on the application, by appropriately combining the above-exemplified monomers and adjusting the amount ratio of the monomers within our range.

It is preferable that, when the above-mentioned two types of ester bond-forming monomers are copolymerized in equimolar amounts, a monomer having a relatively high initial polymerization rate is defined as "monomer A" and a monomer having a relatively low initial polymerization rate is defined as "monomer B", and the initial polymerization rates when they are copolymerized in equimolar amounts are defined as $V_A$ and $V_B$, respectively, $1.1 \leq V_A/V_B \leq 40$ is satisfied.

$V_A$ and $V_B$ are obtained by the following method. The monomers A and the monomers B are mixed in equimolar amounts, and if necessary, a solvent and a catalyst are added thereto, and a polymerization reaction is started by adjusting conditions such as temperature so that an R value is the same as the R value described later in the polyester copolymer finally synthesized or to be synthesized within an error range of 10% Sampling is periodically performed from a sample during polymerization, and the remaining amounts of the monomers A and the monomers B are measured. The remaining amount is measured by, for example, chromatography or nuclear magnetic resonance (NMR) measurement. By subtracting the remaining amount from the charged amount, the amount of monomers subjected to the polymerization reaction is obtained. When the amounts of monomers subjected to the polymerization reaction are plotted against the sampling time, the initial slopes of the curves are $V_A$, $V_B$.

When such monomers A and monomers B are reacted, there is a high probability that the monomer A is bonded to the polymer terminal during polymerization in the initial stage of polymerization. On the other hand, in the latter stage of the polymerization in which the monomer A is consumed and the concentration in the reaction solution decreases, the probability that the monomer B is bonded to the polymer terminal during the polymerization increases. As a result, a gradient polymer in which the ratio of the monomer A residues gradually decreases from one terminal is obtained. Such a gradient polymer has low crystallinity and also suppresses an increase in Young's modulus. To facilitate formation of such a gradient structure, $V_A/V_B$ is more preferably 1.3 or more, and further preferably 1.5 or more. On the other hand, when the difference in polymerization rate between the monomer A and the monomer B is too large, the structure becomes close to a block polymer in which only the monomers A are polymerized and then the monomers B are polymerized, and crystallinity may increase, leading to an increase in Young's modulus. Therefore, $V_A/V_B$ is more preferably 30 or less, further preferably 20 or less, and still more preferably 10 or less.

Preferred combinations of the monomer A and the monomer B include dilactide and ε-caprolactone, glycolide and ε-caperolactone, glycolide and dilactide, dilactide and dioxepanone, ethylene oxalate and dilactide, dilactide and δ-valerolactone, and glycolide and δ-valerolactone.

It is particularly preferable that the monomer A residue is a lactic acid residue, and the monomer B residue is a caprolactone residue.

(1) R Value

When the above-mentioned two types of ester bond-forming monomers are defined as "monomer A" and "monomer B", respectively, the R value represented by the following formula is 0.45 or more and 0.99 or less.

$$R \text{ value}=[AB]/(2[A][B])\times 100$$

[A]: mole fraction of monomer A residues in the polyester copolymer [% by mol],
[B]: mole fraction of monomer B residues in the polyester copolymer [% by mol], and
[AB]: mole fraction of a structure in which the monomer A residues and the monomer B residues are adjacent to each other (A-B and B-A) in the polyester copolymer [% by mol].

The R value is used as an index indicating randomness of a sequence of monomer residues in a copolymer having two types of ester bond-forming monomer residues, that is, the monomer A residues and the monomer B residues, as main structural units. For example, in a random copolymer with completely random monomer sequences, the R value is 1. Also, in the block copolymer, the R value is 0 to 0.44.

The R value can be determined by quantifying the ratio of combinations of two adjacent monomers (A-A, B-B, A-B, B-A) by nuclear magnetic resonance (NMR) measurement, and shall be specifically measured by the method described in Measurement Example 2 described later. When the R value is less than 0.45, the crystallinity is high, a molded article of the copolymer becomes hard, and the Young's modulus increases. On the other hand, when the R value exceeds 0.99, the copolymer molded article becomes too soft and exhibits adhesiveness, resulting in poor handling. From the same viewpoint, the R value of the polyester copolymer is preferably 0.50 or more, and preferably 0.80 or less.

(2) Crystallization Rate

It is known that the crystallinity of a polymer has a great influence on its mechanical strength. In general, since a low crystalline polymer exhibits a low Young's modulus, it is desirable that the crystallinity is low to obtain flexibility. The crystallization rate of the polymer is obtained from the heat of fusion by differential scanning calorimetry (DSC) measurement.

The crystallization rate of at least one of the monomer A residue and the monomer B residue is less than 14%. When the crystallization rate is less than 14%, an increase in Young's modulus is suppressed, and a polyester copolymer suitable for medical materials and elastomer applications can be obtained. The crystallization rate of the monomer A residue and/or the monomer B residue is preferably 10% or less, and more preferably 5% or less.

The crystallization rate of the monomer residue as used herein refers to a ratio of heat of fusion per unit weight of the monomer residues in the polyester copolymer to the product of heat of fusion per unit weight of a homopolymer consisting only of certain monomer residues and a weight fraction of the monomer residues in the polyester copolymer. That is, the crystallization rate of the monomer A residue refers to a ratio of heat of fusion per unit weight of the monomer A residues in the polyester copolymer to the product of heat of fusion per unit weight of a homopolymer consisting only of the monomers A and a weight fraction of the monomer A residue in the polyester copolymer. The crystallization rates of the monomer A residue and the monomer B residue show ratios of forming a crystal structure in the monomer A residue or the monomer B residue of the polyester copolymer, respectively.

In particular, when the monomer A residue is a lactic acid residue and the monomer B residue is a caprolactone residue, the crystallization rate of the lactic acid residue is less than 14%, and more preferably 10% or less. The crystallization rate shall be specifically obtained by the method described in Measurement Example 4 described later.

The weight average molecular weight of the polyester copolymer is preferably 60,000 or more to obtain an effect of improving the tensile strength due to entanglement of polymer chains. The upper limit is not particularly limited, but is preferably 1.6 million or less, more preferably 800,000 or less, and further preferably 400,000 or less, in view of a problem of the production method due to increase in viscosity and decrease in moldability.

The weight average molecular weight can be obtained by a gel permeation chromatography (GPC) method, and shall be specifically obtained by the method described in Measurement Example 1 described later.

As described above, it is desirable that the polymer has low crystallinity to obtain flexibility. In a polyester copolymer in which the polymer A residue is a lactic acid residue and the polymer B residue is a caprolactone residue, the polyester copolymer is molded into a film by a solvent cast film method, and the crystallite size of a polylactic acid a crystal measured by X-ray diffraction (XRD) is preferably 24 nm or less, and more preferably 10 nm or less. Also, the crystallite size of polycaprolactone is preferably 30 nm or less, and more preferably 10 nm or less. These crystallite sizes shall be specifically measured by the method described in Measurement Example 5 described later.

The Young's modulus of the polyester copolymer is preferably 6.3 MPa or less, and more preferably 3.6 MPa or less. The Young's modulus is preferably 0.1 MPa or more, more preferably 0.5 MPa or more, and further preferably 1.0 MPa or more because the molded product cannot maintain the shape if it is too low. The maximum point stress of the polyester copolymer is preferably 5 MPa or more, and more preferably 20 MPa or more. The breaking strain of the polyester copolymer is preferably 200% or more, more preferably 500% or more, and further preferably 1000% or more. A high breaking strain is preferred because the polyester copolymer does not break when subjected to deformation such as elongation. The Young's modulus, maximum point stress, and breaking strain are values obtained in accordance with JIS K6251 (2010), and shall be specifically measured by the method of Measurement Example 3 described later.

Method of Producing Polyester Copolymer

As an example, the polyester copolymer can be produced by a method of producing a polyester copolymer including: a macromer synthesis step of blending and polymerizing monomers A and monomers B, which are two types of ester bond-forming monomers so that a sum of monomer A residues and monomer B residues is 50% by mol or more of all residues, and each of the monomer A residues and the monomer B residues is 20% by mol or more of all residues at the completion of polymerization; and a multimerization step of multimerizing by connecting macromers obtained in the macromer synthesis step, or additionally adding the monomer A and the monomer B to a macromer solution obtained in the macromer synthesis step.

Macromer Synthesis Step

In the macromer synthesis step, the monomers A and the monomers B are blended and polymerized so that a sum of the monomer A residues and the monomer B residues is theoretically 50% by mol or more of all residues, and each of the monomer A residues and the monomer B residues is 20% by mol or more of all residues at the completion of polymerization. As a result, a polyester copolymer having the monomer A residues and the monomer B residues as main structural units is obtained. However, in this production method, since a multimerization step described later is further performed, the polyester copolymer obtained by this step is expressed herein as "macromer".

As the ester bond-forming monomer, the same monomer as described above can be used, and preferred combinations and the like are also the same as described above.

Randomness of a distribution of monomer residues constituting a polyester copolymer having two types of ester bond-forming monomer residues as main structural units varies depending on reactivity of monomers during polymerization. That is, when the same monomer and the other monomer are bonded with the same probability after one of the two types of monomers during polymerization, a random copolymer in which the monomer residues are distributed completely at random can be obtained. However, when either monomer tends to bond after one of the monomers, a gradient copolymer having a biased distribution of the monomer residues is obtained. In the obtained gradient copolymer, the composition of the monomer residues continuously changes from the polymerization start terminal to the polymerization end terminal along the molecular chain.

Assuming that the monomer A is a monomer having an initial polymerization rate higher than that of the monomer B, when the monomer A and the monomer B are copolymerized in the macromer synthesis step, the monomer A tends to bond after the monomer A. Therefore, in the synthesized macromer, a gradient structure in which the ratio of the monomer A unit gradually decreases from the polymerization start terminal to the polymerization end terminal is formed. That is, the macromer obtained in this step is a macromer having a gradient structure in which the monomer A residues and the monomer B residues form a composition gradient in a skeleton due to a difference in the initial polymerization rate between the monomer A and the monomer B. Such a macromer is sometimes referred to herein as "gradient macromer".

In the macromer synthesis step, to realize such a gradient structure, it is desirable to synthesize a macromer by a polymerization reaction that occurs in one direction from the start terminal. As such a synthesis reaction, it is preferable to use ring-opening polymerization or living polymerization.

The macromer obtained in this step has an R value similar to that of the polyester copolymer described in the above (1) to facilitate the production of a polyester copolymer that finally satisfies the R value shown in the above (1), that is, an R value represented by equation:

$$R \text{ value} = [AB]/(2[A][B]) \times 100$$

[A]: mole fraction of monomer A residues in the macromer [% by mol],
[B]: mole fraction of monomer B residues in the macromer [% by mol], and
[AB]: mole fraction of a structure in which the monomer A residues and the monomer B residues are adjacent to each other (A-B and B-A) in the macromer [% by mol],
is 0.45 or more and 0.99 or less, and more preferably 0.50 or more and 0.80 or less.

Similarly, the macromer obtained in this step has a crystallization rate of the monomer residue described in the above (2) to facilitate the production of a polyester copolymer that finally having the crystallization rate of the monomer A residue or the monomer B residue shown in the above (2), that is, the crystallization rate of at least one of the monomer A residue and the monomer B residue is preferably less than 14%, more preferably 10% or less, further preferably 5% or less, and most preferably 1% or less.

The weight average molecular weight of the macromer synthesized in the macromer synthesis step is preferably 10,000 or more, and more preferably 20,000 or more. Further, to suppress crystallinity and maintain flexibility, it is preferably 150,000 or less, and more preferably 100,000 or less.

Multimerization Step

In the multimerization step, multimerization is performed by connecting macromers obtained in the macromer synthesis step, or additionally adding the monomer A and the monomer B to a macromer solution obtained in the macromer synthesis step. In this step, the macromers obtained in one macromer synthesis step may be connected, or a plurality of macromers obtained in two or more macromer synthesis steps may be connected. In addition, the term "multimerization" means to form a structure in which a plurality of molecular chains having a gradient structure in which the monomer A residues and the monomer B residues have a composition gradient in the skeleton are repeated by any of these methods.

The number of macromer units to be multimerized may be 2 or more, but it is preferably 3 or more, more preferably 4 or more, and further preferably 6 or more since an effect of improving tensile strength due to entanglement of molecular chains is obtained when the number of connections is large. On the other hand, when the molecular weight of the polyester copolymer is excessively increased as a result, there is a concern that moldability may be adversely affected by an increase in viscosity, thus the number of macromer units is preferably 80 or less, more preferably 40 or less, and further preferably 20 or less.

The number of connections of macromer units can be adjusted according to a catalyst used in the multimerization step and the reaction time. When multimerization is performed by connecting macromers, the number of macromer units can be obtained by dividing the weight average molecular weight of the finally obtained polyester copolymer by the weight average molecular weight of the macromer.

The polyester copolymer may be a linear polymer in which macromer units are linearly connected, or may be a branched polymer that is branched and connected.

The linear polyester copolymer can be synthesized, for example, by bonding one molecule of the same gradient macromer to both ends of the gradient macromer through the ends.

When the gradient macromer has a hydroxyl group and a carboxyl group at each end, the ends are condensed with a condensing agent to obtain a multimerized polyester copolymer. As the condensing agent, 4,4-dimethylaminopyridinium p-toluenesulfonate, 1-[3-(dimethylamino)propyl]-3-ethylcarbodiimide, 1-ethyl-3-(3-dimethylaminopropyl)carbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 4-(4,6-dimethoxy-1,3,5-triazin-2-yl)-4-methylmorpholinium=chloride n hydrate, (4,6-dimethoxy-1,3,5-triazin-2-yl)-(2-octoxy-2-oxoethyl)dimethylammonium trifluoromethanesulfonate, $^1$H-benzotriazol-1-yloxytris(dimethylamino)phosphonium hexafluorophosphate, $^1$H-benzotriazol-1-yloxytripyrrolidinophosphonium hexafluorophosphate, (7-azabenzotriazol-1-yloxy)tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, O—(N-succinimidyl)-N,N,N',N'-tetramethyluronium tetrafluoroborate, O—(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, S-(1-oxide-2-pyridyl)-N,N,N',N'-tetramethylthiuronium tetrafluoroborate, O-[2-oxo-1(2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene)pyrrolidinium hexafluorophosphate, 2-fluoro-1,3-dimethylimidazolinium hexafluorophosphate, fluoro-N,N,N',N'-tetramethylformamidinium hexafluorophosphate and the like can be used.

In addition, when the polymerization reaction has living characteristics, that is, when the polymerization reaction can be started continuously from the end of the polymer, multimerization can be achieved by repeating an operation of additionally adding the monomer A and the monomer B to the gradient macromer solution after the polymerization reaction is completed.

Alternatively, the gradient macromers may be multimerized via a linker in a range that does not affect mechanical characteristics of the polymer. In particular, when a linker having a plurality of carboxyl groups and/or a plurality of hydroxy groups, for example, 2,2-bis(hydroxymethyl)propionic acid, is used, a branched polyester copolymer having the linker as a branch point can be synthesized.

The polyester copolymer obtained by the production method as described above is a copolymer having a structure in which two or more macromer units having a gradient structure in which the monomer A residues and the monomer B residues have a composition gradient in the skeleton are connected, which is a preferred example of the polyester copolymer. Such a structure is sometimes referred to herein as "multi-gradient" for convenience, and a copolymer having a multi-gradient structure is sometimes referred to herein as "multi-gradient copolymer". The multi-gradient copolymer preferably has a structure in which two or more macromer units having a gradient structure in which the monomer A residues and the monomer B residues have a composition gradient in the skeleton are connected, and preferably has a structure in which three or more are connected.

As described above, a polyester copolymer in which the monomer A residue is a lactic acid residue and the monomer B residue is a caprolactone residue is a particularly preferred example. Such a polyester copolymer is preferably produced by the following production method.

First, in the macromer synthesis step, dilactide and ε-caprolactone are polymerized in the presence of a catalyst. Dilactide and ε-caprolactone monomer are preferably purified to remove impurities prior to use. Dilactide can be purified, for example, by recrystallization from toluene dried over sodium. ε-Caprolactone is purified, for example, by distillation under reduced pressure from $CaH_2$ under $N_2$ atmosphere.

The reactivity of dilactide and ε-caprolactone differs greatly as described in the literature (D. W. Grijpma et al., *Polymer Bulletin* 25, 335-341), and the initial polymerization rate of dilactide monomer is larger than that of ε-caprolactone. The $V_A$ of dilactide is 3.6%/h in terms of reaction rate (%), the $V_B$ of ε-caprolactone is 0.88%/h, and $V_A/V_B$ is 4.1. Therefore, the macromer obtained by copolymerizing dilactide and ε-caprolactone is a gradient macromer.

As a catalyst for the macromer synthesis step having a lactic acid residue and a caprolactone residue, a normal polyester polymerization catalyst such as a germanium-based, titanium-based, antimony-based, or tin-based catalyst can be used. Specific examples of the polyester polymerization catalyst include tin octylate, antimony trifluoride, zinc powder, dibutyltin oxide, and tin oxalate. The method of adding the catalyst to a reaction system is not particularly limited, but it is preferably a method in which the catalyst is added in a state of being dispersed in a raw material when the raw material is charged or in a state of being dispersed at the start of pressure reduction. The amount of the catalyst used is 0.01 to 3% by weight, and more preferably 0.05 to 1.5% by weight in terms of metal atoms, based on the total amount of the monomers used.

A macromer having a lactic acid residue and a caprolactone residue can be obtained by charging dilactide, caprolactone and a catalyst into a reaction vessel equipped with a stirrer and reacting at 150 to 250° C. under a nitrogen stream. When water is used as a co-initiator, it is preferable to perform a cocatalyst reaction at around 90° C. prior to the polymerization reaction. The reaction time is 2 hours or more, preferably 4 hours or more, and further preferably a longer time, for example, 8 hours or more, to increase the degree of polymerization. However, when the reaction is performed too long, a problem of coloring the polymer occurs, and thus, 3 to 12 hours is preferable.

Next, in the multimerization step, the ends of the gradient macromer having a lactic acid residue and a caprolactone residue are connected by a condensation reaction, and multimerized. The reaction temperature of the condensation reaction is preferably 10 to 100° C., and further preferably 20 to 50° C. The reaction time is 1 day or more, and further preferably 2 days or more. However, when the reaction is performed too long, a problem of coloring the polymer occurs, and thus, 2 to 4 days is preferable.

EXAMPLES

Hereinafter, our copolymers and methods will be specifically described with reference to examples, but this disclosure should not be construed as being limited to those examples, and all technical ideas that are conceived by those skilled in the art who contacted the concepts of our copolymers and methods and considered as implementable, and specific modes thereof should be understood as being included in this disclosure.

Measurement Example 1: Measurement of Weight Average Molecular Weight by Gel Permeation Chromatography (GPC)

Device name: Prominence (manufactured by Shimadzu Corporation)
Mobile phase: chloroform (for HPLC) (manufactured by Wako Pure Chemical Industries, Ltd.)
Flow rate: 1 mL/min
Column: TSKgel GMHHR-M (φ7.8 mm×300 mm; manufactured by Tosoh Corporation)
Detector: UV (254 nm), RI
Column, detector temperature: 35° C.
Standard material: polystyrene The purified copolymer was dissolved in chloroform, passed through a 0.45 μm syringe filter (DISMIC-13HP; manufactured by ADVANTEC) to remove impurities and the like, and then measured by GPC to calculate a weight average molecular weight of the copolymer. Results are shown in Table 2.

Measurement Example 2: Measurement of Mole Fraction ([% by mol]) and R Value of Each Residue by Nuclear Magnetic Resonance (NMR)

The purified copolymer was dissolved in deuterated chloroform and measured by $^1$H-NMR to calculate a ratio of lactic acid monomer residues and a ratio of caprolactone monomer residues in the copolymer. In addition, by $^1$H homospin decoupling method, for a methine group of the lactic acid (around 5.10 ppm), an α-methylene group of the caprolactone (around 2.35 ppm), and an ε-methylene group (around 4.10 ppm), adjacent monomer residues were separated by a signal derived from the lactic acid or caprolactone, and each peak area was quantified. In a purified copolymer of Example 8 using δ-valerolactone instead of ε-caprolactone, similarly, for the methine group of the lactic acid (around 5.10 ppm), an α-methylene group of the valerolactone (around 2.35 ppm), and a δ-methylene group (around 4.10 ppm), adjacent monomer residues were separated by a signal derived from the lactic acid or valerolactone, and each peak area was quantified. R value was calculated by calculating [AB] of Formula 1 from each area ratio. [AB] is a mole fraction [% by mol] of the structure in which the lactic acid residue and the caprolactone residue or valerolactone residue are adjacent to each other, and specifically, it is a ratio of the number of A-B and B-A with respect to the total number of A-A, A-B, B-A, and B-B.
Device name: JNM-EX270 (manufactured by JEOL Ltd.)
$^1$H Homospin decoupling irradiation position: 1.66 ppm
Solvent: deuterated chloroform
Measurement temperature: room temperature Measurement Example 3: Tensile Test The purified copolymer was dried under reduced pressure, dissolved in chloroform to have a concentration of 5% by weight, and the solution was transferred onto a polytetrafluoroethylene petri dish and dried at normal pressure and room temperature for one day and night. This was dried under reduced pressure to obtain a copolymer film.

The obtained copolymer film (thickness: about 0.1 mm) was cut into strips (50 mm×5 mm), a tensile test was conducted with Tensilon universal testing machine RTM-100 (manufactured by Orientec Co., Ltd.) according to JIS K6251 (2010) under the following conditions, and the Young's modulus, maximum point stress, and breaking strain were calculated. Results are shown in Table 2.
Device name: Tensilon universal tensile tester RTM-100 (manufactured by Orientec Co., Ltd.)
Initial length: 10 mm
Tensile speed: 500 mm/min
Load cell: 50 N
Number of tests: 5

Measurement Example 4: Measurement of Crystallization Rate of Lactic Acid Residue by Differential Scanning Calorimetry (DSC)

The purified copolymer was dried under reduced pressure, dissolved in chloroform to have a concentration of 5% by weight, and the solution was transferred onto a polytetrafluoroethylene petri dish and dried at normal pressure and room temperature for one day and night. This was dried under reduced pressure to obtain a copolymer film. The obtained copolymer film was collected on alumina PAN, measured by DSC method with a differential scanning calorimeter under the following conditions, and the heat of fusion was calculated from the measurement results of temperature conditions (D) to (E). The crystallization rate was calculated from the following formula. Results are shown in Table 2.

Crystallization rate=(Heat of fusion per unit weight of lactic acid residues of polyester copolymer)/{ (Heat of fusion per unit weight of homopolymer consisting only of lactic acid residues)× (Weight fraction of lactic acid residues in polyester copolymer)}×100

Device name: EXSTAR 6000 (manufactured by Seiko Instruments Inc.)
Temperature conditions: (A) 25° C.→(B) 250° C. (10° C./min)→(C) 250° C. (5 min)→(D)→70° C. (10° C./min) →(E) 250° C. (10° C./min)→(F) 250° C. (5 min)→(G) 25° C. (100° C./min) Standard material: Alumina Measurement Example 5: Measurement of Crystallite Size by X-Ray Diffraction (XRD)

The purified copolymer was dried under reduced pressure, dissolved in chloroform to have a concentration of 5% by weight, and the solution was transferred onto a polytetrafluoroethylene petri dish and dried at normal pressure and room temperature for one day and night. This was dried under reduced pressure to obtain a copolymer film.

The copolymer film was cut into approximately 1 cm square, placed on a Si non-reflective plate and scanned in the film normal direction, and wide-angle X-ray diffraction was measured by a reflective 2θ-θ scan method. From 2θ-θ intensity data obtained by wide-angle X-ray diffraction measurement, peak separation was performed, and crystallite size (nm) was calculated from half width of each peak using Scherrer's formula. Comparison of crystallite size between polymers was performed using polylactic acid a crystals (100 or 200) and polycaprolactone crystals (2θ=about 21°).

The measurement conditions are shown below.
(1) X-ray diffractometer: D8 ADVANCE (enclosed tube type) manufactured by Bruker AXS GmbH
X-ray source: CuKα ray
(Uses Graphite Curved Crystal Monochromator)
Output: 40 kV, 40 mA
Slit system: DS=0.3 o
Detector: LynxEye (high-speed detector)
(2) Scan method: 2θ-θ continuous scan
(3) Measurement range (2θ): 5 to 40 o
(4) Step width (2θ): 0.017 o
(5) Scan speed: 0.5 seconds/step
(6) Correction value of half width: 0.13

Scherrer's Formula $$L = \frac{K\lambda}{\beta \cos\theta}$$

$$\beta = \sqrt{\beta_e^2 - \beta_o^2}$$

wherein, $\lambda$: incident X-ray wavelength (=0.15418 nm), $\beta_e$: diffraction peak half width (o), $\beta_o$: correction value of half width (=0.13 o), and K: Scherrer constant (=0.9).

Example 1

50.0 g of $_L$-lactide (PURASORB L; manufactured by PURAC) and 38.5 mL of ε-caprolactone (manufactured by Wako Pure Chemical Industries, Ltd.) were collected as monomers in a separable flask. These were placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.), and ion-exchanged water as a co-initiator were added to have the monomer/co-initiator ratio in Table 1. The mixture was subjected to cocatalyst reaction at the temperature described in "Temperature 1" for the time described in "Time 1" in Table 1, and then subjected to copolymerization reaction at the temperature described in "Temperature 2" for the time described in "Time 2" to obtain a crude copolymer.

The obtained crude copolymer was dissolved in 100 mL of chloroform, and the solution was added dropwise to 1400 mL of stirred methanol to obtain a precipitate. This operation was repeated three times, and the precipitate was dried under reduced pressure at 70° C. to obtain a macromer.

65 g of the macromer, 2.4 g of 4,4-dimethylaminopyridinium p-toluenesulfonate (synthetic product) as a catalyst and 0.86 g of 4,4-dimethylaminopyridine (manufactured by Wako Pure Chemical Industries, Ltd.) were collected. These were placed in an argon atmosphere and dissolved in dichloromethane (dehydrated) (manufactured by Wako Pure Chemical Industries, Ltd.) to have the concentrations in Table 1, and 12 g of dicyclohexylcarbodiimide (manufactured by Sigma-Aldrich) that is a condensing agent dissolved in 40 mL of dichloromethane was added, then the mixture was subjected to condensation polymerization at room temperature for 2 days.

To the reaction mixture was added 250 mL of chloroform, and the resulting mixture was added dropwise to 4000 mL of stirred methanol to obtain a precipitate. This precipitate was dissolved in 400 mL of chloroform, and the solution was added dropwise to 4000 mL of stirred methanol to obtain a precipitate. This operation was repeated twice to obtain a purified polyester copolymer as a precipitate.

Examples 2, 3, 6, 7

50.0 g of $_L$-lactide (PURASORB L; manufactured by PURAC) and 38.5 mL of ε-caprolactone (manufactured by Wako Pure Chemical Industries, Ltd.) were collected as monomers in a separable flask. These were placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.), and ion-exchanged water as a co-initiator were added to have the monomer/co-initiator ratio in Table 1. The mixture was subjected to cocatalyst reaction at the temperature described in "Temperature 1" for the time described in "Time 1" in Table 1, and then subjected to copolymerization reaction at the temperature described in "Temperature 2" for the time described in "Time 2" to obtain a crude copolymer.

The obtained crude copolymer was dissolved in 100 mL of chloroform, and the solution was added dropwise to 1400 mL of stirred methanol to obtain a precipitate. This operation was repeated three times, and the precipitate was dried under reduced pressure at 70° C. to obtain a macromer.

7.5 g of the macromer, 0.28 g of 4,4-dimethylaminopyridinium p-toluenesulfonate (synthetic product) as a catalyst and 0.10 g of 4,4-dimethylaminopyridine (manufactured by Wako Pure Chemical Industries, Ltd.) were collected. These were placed in an argon atmosphere and dissolved in dichloromethane (dehydrated) (manufactured by Wako Pure Chemical Industries, Ltd.) to have the concentrations in Table 1, and 1.38 g of dicyclohexylcarbodiimide (manufactured by Sigma-Aldrich) that is a condensing agent dissolved in 5 mL of dichloromethane was added, then the mixture was subjected to condensation polymerization at room temperature for 2 days.

To the reaction mixture was added 30 mL of chloroform, and the resulting mixture was added dropwise to 500 mL of stirred methanol to obtain a precipitate. This precipitate was dissolved in 50 mL of chloroform, and the solution was added dropwise to 500 mL of stirred methanol to obtain a precipitate. This operation was repeated twice to obtain a purified polyester copolymer as a precipitate.

Example 4

50.0 g of $_L$-lactide (PURASORB L; manufactured by PURAC) and 38.5 mL of ε-caprolactone (manufactured by Wako Pure Chemical Industries, Ltd.) were collected as monomers in a separable flask. These were placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.), and ion-exchanged water as a co-initiator were added to have the monomer/co-initiator ratio in Table 1. The mixture was subjected to cocatalyst reaction at the temperature described in "Temperature 1" for the time described in "Time 1" in Table 1, and then subjected to copolymerization reaction at the temperature described in "Temperature 2" for the time described in "Time 2" to obtain a crude copolymer.

The obtained crude copolymer was dissolved in 100 mL of chloroform, and the solution was added dropwise to 1400 mL of stirred methanol to obtain a precipitate. This operation was repeated three times, and the precipitate was dried under reduced pressure at 70° C. to obtain a macromer.

30 g of the macromer, 1.12 g of 4,4-dimethylaminopyridinium p-toluenesulfonate (synthetic product) as a catalyst and 0.40 g of 4,4-dimethylaminopyridine (manufactured by Wako Pure Chemical Industries, Ltd.) were collected. These were placed in an argon atmosphere and dissolved in dichloromethane (dehydrated) (manufactured by Wako Pure Chemical Industries, Ltd.) to have the concentrations in Table 1, and 5.52 g of dicyclohexylcarbodiimide (manufactured by Sigma-Aldrich) that is a condensing agent dissolved in 20 mL of dichloromethane was added, then the mixture was subjected to condensation polymerization at room temperature for 2 days.

To the reaction mixture was added 120 mL of chloroform, and the resulting mixture was added dropwise to 2000 mL of stirred methanol to obtain a precipitate. This precipitate was dissolved in 200 mL of chloroform, and the solution was added dropwise to 2000 mL of stirred methanol to obtain a precipitate. This operation was repeated twice to obtain a purified polyester copolymer as a precipitate.

Example 5

A purified polyester copolymer was obtained in the same manner as in Examples 2 and 3 except that 2,2-bis(hydroxymethyl)propionic acid as a co-initiator (linker) was added to have the monomer/co-initiator ratio in Table 1, and the mixture was subjected to copolymerization reaction at 150° C. for 6 hours without performing a cocatalyst reaction.

Comparative Example 1: Production Method of Gradient Polymer 50.0 g of $_L$-lactide (PURASORB L; manufactured by PURAC) and 38.5 mL of ε-caprolactone (manufactured by Wako Pure Chemical Industries, Ltd.) were collected as monomers in a separable flask. These were placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.) was added thereto, and the mixture was subjected to copolymerization reaction at the temperature described in "Temperature 2" for the time described in "Time 2" to obtain a crude copolymer.

The obtained crude copolymer was dissolved in 100 mL of chloroform, and the solution was added dropwise to 1400 mL of stirred methanol to obtain a precipitate. This operation was repeated three times to obtain a gradient copolymer as a precipitate. This precipitate was dried under reduced pressure at 70° C.

Comparative Example 2: Production Method of Block Copolymer 50.0 g of $_L$-lactide (PURASORB L; manufactured by PURAC) was collected as a monomer in a separable flask. This was placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.) was added thereto, and the mixture was subjected to polymerization reaction at the temperature described in "Temperature 2" for the time described in "Time 2". 38.5 mL of ε-caprolactone (manufactured by Wako Pure Chemical Industries, Ltd.) was added thereto and, further, the mixture was subjected to polymerization reaction at the temperature described in "Temperature 3" for the time described in "Time 3" in Table 1 to obtain a crude copolymer.

The obtained crude copolymer was dissolved in 100 mL of chloroform, and the solution was added dropwise to 1400 mL of stirred methanol to obtain a precipitate. This operation was repeated three times, and the precipitate was dried under reduced pressure at 70° C. to obtain a block copolymer.

Comparative Examples 3 and 4: Production Method of Multi-Block Copolymer 50.0 g of $_L$-lactide (PURASORB L; manufactured by PURAC) was collected as a monomer in a separable flask. This was placed in an argon atmosphere, 0.81 g of tin(II) octylate (manufactured by Wako Pure Chemical Industries, Ltd.) that is a catalyst dissolved in 14.5 mL of toluene (super dehydrated) (manufactured by Wako Pure Chemical Industries, Ltd.), and ion-exchanged water as a co-initiator were added to have the monomer/co-initiator ratio in Table 1. The mixture was subjected to cocatalyst reaction at the temperature described in "Temperature 1" for the time described in "Time 1" in Table 1, and then subjected to polymerization reaction at the temperature described in "Temperature 2" for the time described in "Time 2".

38.5 mL of ε-caprolactone (manufactured by Wako Pure Chemical Industries, Ltd.) was added thereto, and further, the mixture was subjected to polymerization reaction at the temperature described in "Temperature 3" for the time described in "Time 3" in Table 1 to obtain a crude copolymer.

The obtained crude copolymer was dissolved in 100 mL of chloroform, and the solution was added dropwise to 1400 mL of stirred methanol to obtain a precipitate. This operation was repeated three times, and the precipitate was dried under reduced pressure at 70° C. to obtain a purified copolymer.

7.5 g of the purified copolymer, 0.28 g of 4,4-dimethylaminopyridinium p-toluenesulfonate (synthetic product) as a catalyst and 0.10 g of 4,4-dimethylaminopyridine (manufactured by Wako Pure Chemical Industries, Ltd.) were collected. These were placed in an argon atmosphere and dissolved in dichloromethane (dehydrated) (manufactured by Wako Pure Chemical Industries, Ltd.) to have the concentrations in Table 1, and 1.38 g of dicyclohexylcarbodiimide (manufactured by Sigma-Aldrich) that is a condensing agent dissolved in 5 mL of dichloromethane was added, then the mixture was subjected to condensation polymerization at room temperature for 2 days.

To the reaction mixture was added 30 mL of chloroform, and the resulting mixture was added dropwise to 500 mL of stirred methanol to obtain a precipitate. This precipitate was dissolved in 50 mL of chloroform, and the solution was added dropwise to 500 mL of stirred methanol to obtain a precipitate. This operation was repeated twice to obtain a precipitate, i.e., a purified copolymer.

The production conditions of each Example and Comparative Example are shown in Table 1, and the constitution and various evaluation results of each produced copolymer are shown in Table 2.

TABLE 1

| | Macromer synthesis | | | | | | |
|---|---|---|---|---|---|---|---|
| | Dilactide/ Caprolactone (Charge molar ratio) | Co-initiator | [Monomer]/ [Co-initiator] | Temperature 1 (° C.) | Time 1 (h) | Temperature 2 (° C.) | Time 2 (h) |
| Example 1 | 50/50 | Ion-exchanged water | 142.9 | 90 | 1 | 150 | 6 |
| Example 2 | 50/50 | Ion-exchanged water | 142.9 | 90 | 1 | 150 | 6.5 |
| Example 3 | 50/50 | Ion-exchanged water | 142.9 | 90 | 1 | 150 | 6 |
| Example 4 | 50/50 | Ion-exchanged water | 285.7 | 90 | 1 | 150 | 12 |
| Example 5 | 50/50 | 2,2-Bis (hydroxymethyl) propionic acid | 71.4 | — | — | 150 | 6 |
| Example 6 | 50/50 | Ion-exchanged water | 285.7 | 90 | 1 | 150 | 12 |
| Example 7 | 50/50 | Ion-exchanged water | 285.7 | 90 | 1 | 150 | 12 |
| Comparative Example 1 | 50/50 | — | — | — | — | 150 | 6 |
| Comparative Example 2 | 50/50 | — | — | — | — | 150 | 3 |
| Comparative Example 3 | 50/50 | Ion-exchanged water | 142.9 | 90 | 1 | 150 | 3 |
| Comparative Example 4 | 50/50 | Ion-exchanged water | 142.9 | 90 | 1 | 150 | 3 |

| | Macromer synthesis | | | Multimerization | | | Macromer |
|---|---|---|---|---|---|---|---|
| | Temperature 3 (° C.) | Time 3 (h) | Molecular weight | Temperature (° C.) | Time (day) | Concentration (% By weight) | charge weight (g) |
| Example 1 | — | — | 22,559 | Room temperature | 2 | 30 | 65 |
| Example 2 | — | — | 35,232 | Room temperature | 2 | 30 | 7.5 |
| Example 3 | — | — | 31,352 | Room temperature | 2 | 30 | 7.5 |
| Example 4 | — | — | 33,036 | Room temperature | 2 | 20 | 30 |
| Example 5 | — | — | 23,601 | Room temperature | 2 | 30 | 7.5 |
| Example 6 | — | — | 40,648 | Room temperature | 2 | 20 | 7.5 |
| Example 7 | — | — | 40,648 | Room temperature | 2 | 10 | 7.5 |

TABLE 1-continued

| | | | | | | | |
|---|---|---|---|---|---|---|---|
| Comparative Example 1 | — | — | — | — | — | — | — |
| Comparative Example 2 | 150 | 6 | — | — | — | — | — |
| Comparative Example 3 | 150 | 6 | 19,019 | Room temperature | 2 | 5 | 7.5 |
| Comparative Example 4 | 150 | 6 | 57,167 | Room temperature | 2 | 27 | 7.5 |

TABLE 2

| | Polymer structure | $V_A/V_B$ | [A] Mole fraction of lactic acid (% By mol) | [B] Mole fraction of caprolactone (% By mol) | Mole fraction of [AB] (% By mol) | R value | Crystallization rate of lactic acid residue (%) | Weight average molecular weight |
|---|---|---|---|---|---|---|---|---|
| Example 1 | Multi-gradient | 4.1 | 55.2 | 44.8 | 30 | 0.61 | 0.0 | 95,624 |
| Example 2 | Multi-gradient | 4.1 | 52.1 | 47.9 | 26 | 0.52 | 0.0 | 200,866 |
| Example 3 | Multi-gradient | 4.1 | 52.2 | 47.8 | 25 | 0.50 | 0.0 | 212,299 |
| Example 4 | Multi-gradient | 4.1 | 49.5 | 50.5 | 49 | 0.99 | 0.0 | 262,666 |
| Example 5 | Branch multi-gradient | 4.1 | 50.3 | 49.7 | 26 | 0.52 | 0.0 | 119,825 |
| Example 6 | Multi-gradient | 4.1 | 49.0 | 51.0 | 37 | 0.74 | 0.0 | 353,064 |
| Example 7 | Multi-gradient | 4.1 | 48.9 | 51.1 | 42 | 0.85 | 0.0 | 284,430 |
| Comparative Example 1 | Gradient | 4.1 | 49.6 | 50.4 | 23 | 0.47 | 16.2 | 41,618 |
| Comparative Example 2 | Block | 4.1 | 52.4 | 47.6 | 11 | 0.21 | 31.6 | 148,364 |
| Comparative Example 3 | Multiblock | 4.1 | 52.1 | 47.9 | 16 | 0.33 | 14.0 | 138,443 |
| Comparative Example 4 | Multiblock | 4.1 | 50.7 | 49.3 | 15 | 0.30 | 42.2 | 169,166 |

| | Number of macromer units | Mechanical characteristics | | | Crystallite size (nm) | |
|---|---|---|---|---|---|---|
| | | Young's modulus (MPa) | Maximum point stress (MPa) | breaking strain (%) | Polylactic acid α crystal | Polycaprolactone |
| Example 1 | 4.2 | 6.3 ± 1.1 | 8.3 ± 0.1 | 963.7 ± 101.2 | — | — |
| Example 2 | 5.7 | 3.4 ± 0.3 | 29.9 ± 10.1 | 1071.4 ± 183.0 | — | — |
| Example 3 | 6.8 | 3.6 ± 0.5 | 27.8 ± 6.2 | 950.6 ± 197.5 | 22.0 | 0.0 |
| Example 4 | 8.0 | 3.1 ± 0.3 | 21.1 ± 5.5 | 1369.3 ± 152.5 | ND | ND |
| Example 5 | 5.1 | 2.5 ± 0.3 | 6.7 ± 0.9 | 1564.0 ± 174.8 | — | — |
| Example 6 | 8.7 | 3.2 ± 0.2 | 22.7 ± 4.7 | 1156.8 ± 69.9 | ND | ND |
| Example 7 | 7.0 | 3.1 ± 0.2 | 24.6 ± 5.5 | 1265.2 ± 139.4 | ND | ND |
| Comparative Example 1 | — | 28.6 ± 1.1 | 21.8 ± 1.5 | 1032.2 ± 40.0 | 27.6 | 30.2 |
| Comparative Example 2 | — | 112.6 ± 3.9 | 31.6 ± 3.8 | 833.4 ± 145.5 | 18.2 | 33.7 |
| Comparative Example 3 | 7.3 | 25.4 ± 3.7 | 23.4 ± 5.7 | 421.5 ± 66.5 | — | — |
| Comparative Example 4 | 3.0 | 46.6 ± 1.9 | 13.0 ± 1.1 | 316.8 ± 51.7 | — | — |

Example 8

25.0 g of $_L$-lactide (PURASORB L; manufactured by PURAC) and 15.6 mL of δ-valerolactone (manufactured by Tokyo Chemical Industry Co., Ltd.) were collected as monomers in a separable flask. These were placed in an argon atmosphere, 0.14 g of tin(II) octylate (manufactured by Wako Pure Chemical Industries, Ltd.) that is a catalyst dissolved in 7.25 mL of toluene (super dehydrated) (manufactured by Wako Pure Chemical Industries, Ltd.) and 45 μL of ion-exchanged water as a co-initiator were added, and a cocatalyst reaction was performed at 90° C. for 1 hour, followed by a copolymerization reaction at 130° C. for 24 hours to obtain a crude copolymer.

The obtained crude copolymer was dissolved in 50 mL of chloroform, and the solution was added dropwise to 700 mL of stirred methanol to obtain a precipitate. This operation was repeated three times, and the precipitate was dried under reduced pressure at 60° C. to obtain a macromer.

7.54 g of the macromer, 0.28 g of 4,4-dimethylamino-pyridinium p-toluenesulfonate (synthetic product) as a catalyst and 0.12 g of 4,4-dimethylaminopyridine (manufactured by Wako Pure Chemical Industries, Ltd.) were collected. These were placed in an argon atmosphere and dissolved in 25 mL of dichloromethane (dehydrated) (manufactured by Wako Pure Chemical Industries, Ltd.), and 1.41 g of dicyclohexylcarbodiimide (manufactured by Sigma-Aldrich) that is a condensing agent dissolved in 5 mL of dichloromethane was added, then the mixture was subjected to condensation polymerization at room temperature for 2 days.

To the reaction mixture was added 20 mL of chloroform, and the resulting mixture was added dropwise to 500 mL of stirred methanol to obtain a precipitate. This precipitate was dissolved in 30 mL of chloroform, and the solution was added dropwise to 400 mL of stirred methanol to obtain a precipitate. This operation was repeated twice to obtain a purified polyester copolymer as a precipitate.

Figure 5:
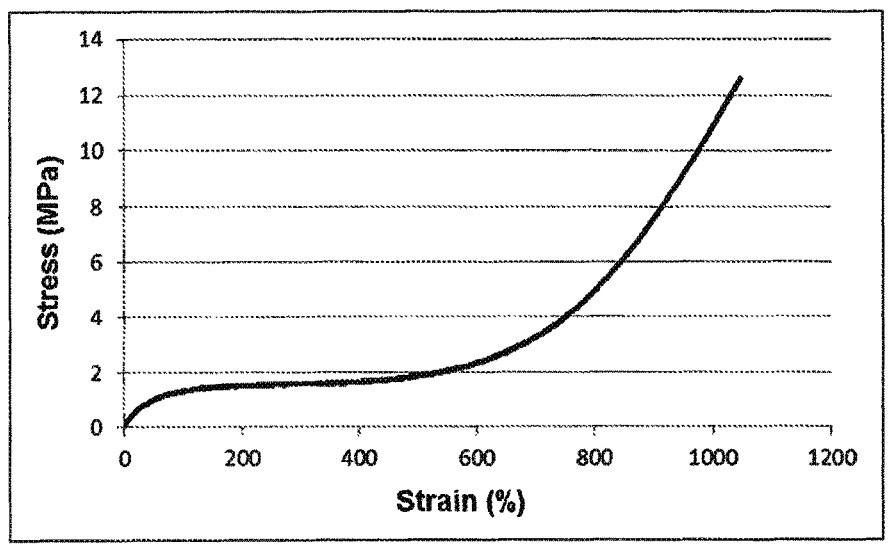
FIG. 5 shows a stress-strain curve obtained by performing a tensile test on a polyester copolymer synthesized in Example 8.

FIG. 5 shows a stress-strain curve obtained by performing a tensile test on the multi-block copolymer produced in Example 8, and various evaluation results are shown in Table 3.

gradient structure in which the monomer A residues and the monomer B residues form a composition gradient in a skeleton are connected.

4. The polyester copolymer according to claim 1, having a weight average molecular weight of 60,000 or more.

5. The polyester copolymer according to claim 1, wherein the two types of ester bond-forming monomers are com-

TABLE 3

| | Polymer structure | $V_A/V_B$ | [A] Mole fraction of lactic acid (% By mol) | [B] Mole fraction of valerolactone (% By mol) | [AB] (% By mol) | R value | Crystallization rate of lactic acid residue (%) |
|---|---|---|---|---|---|---|---|
| Example 8 | Multi-gradient | 9.5 | 53 | 47 | 35.37 | 0.71 | 0 |

| | Weight average molecular weight | Number of macromer units | Mechanical characteristics | | |
|---|---|---|---|---|---|
| | | | Young's modulus (MPa) | Maximum point stress (MPa) | breaking strain (%) |
| Example 8 | 1,491,700 | 9.98 | 2.49 ± 0.29 | 11.1 ± 1.9 | 1024.7 ± 45.2 |

INDUSTRIAL APPLICABILITY

As specific applications of the polyester copolymer, uses for non-woven fabrics as fibers, disposable toiletry products and cosmetics as containers, packaging films, agricultural multi-films and tapes as films and the like are considered. As other medical applications, sutures, artificial bones, artificial skin, wound dressings, DDS fields such as microcapsules, scaffold materials for tissue and organ regeneration and the like are considered. Furthermore, uses for other binders for toner and thermal transfer ink are considered, but applications are not limited thereto.

The invention claimed is:

1. A polyester copolymer having two types of ester bond-forming monomer residues as main structural units, wherein, when the two types of ester bond-forming monomers are defined as "monomer A" and "monomer B", respectively, the polyester copolymer satisfies (1) and (2):

(1) an R value represented by equation:

$$R \text{ value}=[AB]/(2[A][B])\times 100$$

[A]: mole fraction of monomer A residues in the polyester copolymer [% by mol],
[B]: mole fraction of monomer B residues in the polyester copolymer [% by mol], and
[AB]: mole fraction of a structure in which the monomer A residues and the monomer B residues are adjacent to each other (A-B and B-A) in the polyester copolymer [% by mol], is 0.45 or more and 0.99 or less; and (2) a crystallization rate of at least one of the monomer A residues and the monomer B residues is less than 14%.

2. The polyester copolymer according to claim 1, wherein, when the monomer A and the monomer B are copolymerized in equimolar amounts, a monomer having a relatively high initial polymerization rate is defined as "monomer A" and a monomer having a relatively low initial polymerization rate is defined as "monomer B", and the initial polymerization rates when they are copolymerized in equimolar amounts are defined as $V_A$ and $V_B$, respectively, $1.1 \leq V_A/V_B \leq 40$ is satisfied.

3. The polyester copolymer according to claim 1, having a structure in which two or more macromer units having a pounds selected from the group consisting of hydroxycarboxylic acid, lactone, and lactide.

6. The polyester copolymer according to claim 5, wherein the monomer A residue is a lactic acid residue, and the monomer B residue is a caprolactone residue or a valerolactone residue.

7. The polyester copolymer according to claim 6, wherein a crystallite size of a polylactic acid a crystal is 24 nm or less.

8. The polyester copolymer according to claim 6, wherein a crystallite size of polycaprolactone is 30 nm or less.

9. The polyester copolymer according to claim 1, having biodegradability or bioabsorbability.

10. The polyester copolymer according to claim 1, having a Young's modulus of 6.3 MPa or less and a maximum point stress of 5 MPa or more.

11. A method of producing a polyester copolymer comprising:
a macromer synthesis step of blending and polymerizing monomers A and monomers B, which are two types of ester bond-forming monomers so that a sum of monomer A residues and monomer B residues is 50% by mol or more of all residues, and each of the monomer A residues and the monomer B residues is 20% by mol or more of all residues at the completion of polymerization; and
a multimerization step of multimerizing by connecting macromers obtained in the macromer synthesis step, or additionally adding the monomer A and the monomer B to a macromer solution obtained in the macromer synthesis step.

12. The method according to claim 11, wherein an R value of the macromer obtained in the macromer synthesis step, represented by equation:

$$R \text{ value}=[AB]/(2[A][B])\times 100$$

[A]: mole fraction of monomer A residues in the macromer [% by mol],
[B]: mole fraction of monomer B residues in the macromer [% by mol], and

[AB]: mole fraction of a structure in which the monomer A residues and the monomer B residues are adjacent to each other (A-B and B-A) in the macromer [% by mol], is 0.45 or more and 0.99 or less.

13. The method according to claim 11, wherein a crystallization rate of at least one of the monomer A residues and the monomer B residues of the macromer obtained in the macromer synthesis step is less than 14%.

14. The method according to claim 11, wherein the two types of ester bond-forming monomers are compounds selected from the group consisting of hydroxycarboxylic acid, lactone, and lactide.

15. The method according to claim 14, wherein the monomer A residue is a lactic acid residue, and the monomer B residue is a caprolactone residue or a valerolactone residue.

\* \* \* \* \*